United States Patent
Yao et al.

(10) Patent No.: US 10,117,151 B2
(45) Date of Patent: Oct. 30, 2018

(54) METHOD AND DEVICE FOR PROCESSING INFORMATION INTERACTION, OFFLOADING PROCESSING METHOD AND DEVICE, BASE STATION, RNC AND UE

(71) Applicant: ZTE Corporation, Shenzhen (CN)

(72) Inventors: Jun Yao, Shenzhen (CN); Qian Dai, Shenzhen (CN); Yunpeng Cui, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/910,985

(22) PCT Filed: Apr. 29, 2014

(86) PCT No.: PCT/CN2014/076454
§ 371 (c)(1),
(2) Date: May 31, 2016

(87) PCT Pub. No.: WO2015/018213
PCT Pub. Date: Feb. 12, 2015

(65) Prior Publication Data
US 2016/0262078 A1    Sep. 8, 2016

(30) Foreign Application Priority Data

Aug. 8, 2013   (CN) .......................... 2013 1 0344672

(51) Int. Cl.
*H04W 36/14*   (2009.01)
*H04W 36/30*   (2009.01)
(Continued)

(52) U.S. Cl.
CPC .......... *H04W 36/30* (2013.01); *H04W 24/10* (2013.01); *H04W 36/0072* (2013.01);
(Continued)

(58) Field of Classification Search
CPC ..... H04W 24/02; H04W 24/10; H04W 36/14; H04W 36/16; H04W 36/30;
(Continued)

(56) References Cited

U.S. PATENT DOCUMENTS

2006/0034236 A1*   2/2006   Jeong .................... H04W 48/10
                                                                370/338
2012/0196644 A1*   8/2012   Scherzer ............... H04W 72/02
                                                                455/524
(Continued)

FOREIGN PATENT DOCUMENTS

CA           2847725 A1     3/2013
CN           102480712 A    5/2012
(Continued)

OTHER PUBLICATIONS

Broadcom Corporation, "Air-Interface Enhancement Proposals for WLAN/3GPP Radio Interworking", Enhancement Proposals 3rd Genderation Partnership Project, Apr. 5, 2013.

(Continued)

*Primary Examiner* — Mohamed Kamara
(74) *Attorney, Agent, or Firm* — Cantor Colburn LLP (57) ABSTRACT

The provided are method and device for processing information interaction, the offloading processing method and device, a base station, an RNC and UE. The method for processing information interaction includes that: a target side network element for handover of UE receives at least one of the following source side information sent by a source side network element: WLAN auxiliary information, offloading rule information, WLAN measurement report information, offloading decision information and information indicating a capability in supporting interoperation with a WLAN; and/or, the target side network element sends at least one of the following target side information to the source side network element: WLAN auxiliary information, (Continued)

load information, offloading rule information, measurement configuration information, offloading decision information and information indicating a capability in supporting interoperation with the WLAN. According to the present disclosure, the effect of saving UE energy and network resources is further achieved.

10 Claims, 6 Drawing Sheets

(51) Int. Cl.
  *H04W 36/00* (2009.01)
  *H04W 24/10* (2009.01)
  *H04W 48/16* (2009.01)
  *H04W 84/12* (2009.01)

(52) U.S. Cl.
  CPC ........... *H04W 36/14* (2013.01); *H04W 48/16* (2013.01); *H04W 84/12* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01)

(58) Field of Classification Search
  CPC ......... H04W 36/0072; H04W 36/0055; H04W 48/16; H04W 48/18; H04W 84/12; H04W 28/08; H04W 16/08
  See application file for complete search history.

(56) References Cited

U.S. PATENT DOCUMENTS

| | | | | |
|---|---|---|---|---|
| 2013/0201842 A1* | 8/2013 | Chou | ................... | H04W 28/08 370/252 |
| 2014/0064068 A1* | 3/2014 | Horn | ................. | H04W 28/0289 370/230 |
| 2014/0092742 A1* | 4/2014 | Chou | ................ | H04W 52/0258 370/235 |
| 2014/0199996 A1* | 7/2014 | Wang | ................... | H04W 36/14 455/426.1 |
| 2014/0376515 A1* | 12/2014 | Lei | ................... | H04W 36/0061 370/331 |

FOREIGN PATENT DOCUMENTS

| | | |
|---|---|---|
| CN | 102843740 A | 12/2012 |
| CN | 103209440 A | 7/2013 |
| EP | 1746856 A1 | 1/2007 |
| EP | 2996396 A1 | 3/2016 |
| JP | 2012253680 A | 12/2012 |
| JP | 2013522986 A | 6/2013 |
| WO | 2012126848 A1 | 9/2012 |
| WO | 2013040978 A1 | 3/2013 |

OTHER PUBLICATIONS

European Search Report for corresponding application EP 14834846; Report dated Jun. 17, 2016.
Vodafone, "WLAN-NS Key Issue #4-Solution", 3rd Generation Partnership Project, Jan. 22, 2013.
International Search Report for corresponding PCT/CN2014/076454 filed on Apr. 29, 2014; dated Aug. 6, 2014.

* cited by examiner

METHOD AND DEVICE FOR PROCESSING INFORMATION INTERACTION, OFFLOADING PROCESSING METHOD AND DEVICE, BASE STATION, RNC AND UE

TECHNICAL FIELD

The present disclosure relates to the field of communication, and in particular to method and device for processing information interaction, offloading processing method and device, a base station, a Radio Network Control (RNC) and User Equipment (UE).

BACKGROUND

With continuous evolution of a wireless communication technology and standard, mobile packet services are greatly developed, and a data throughput capability of single UE is continuously improved. For example, a Long Term Evolution (LTE) system may support downlink data transmission at a maximum rate of 100 Mbps within a 20 M bandwidth, and a data transmission rate of a subsequent LTE advanced system may further be increased, and may even reach 1 Gbps.

Explosive growth of data services of UE gradually tensions existing network resources particularly under the condition that network layout of a new-generation communication technology (such as 3rd-Generation (3G) and LTE) may not be widely implemented, which consequently causes incapability in meeting requirements of users on rate and traffic and poorer user experiences. How to prevent and change such a condition is a problem that an operator must consider, and on one hand, it is necessary to accelerate popularization of a new technology and network deployment; and on the other hand, it is expected that an existing network and technology may be enhanced to fulfil the aim of rapidly improving network performance. As everyone knows, except a wireless network technology provided by the 3rd Generation Partnership Project (3GPP), a Wireless Local Area Network (WLAN) which has been widely applied at present, particularly an IEEE802.11-standard-based WLAN, has been widely applied to hotspot access coverage in homes, enterprises and even the Internet. Wherein a technical specification proposed by the Wireless Fidelity (WIFI) Alliance is most widely applied, so that a WIFI network usually equals to the IEEE802.11-standard-based WLAN in practice, and under the condition of no confusions, a WIFI module is adopted to describe a WLAN supporting wireless transceiver and processing module in a network node hereinafter.

Figure 1:
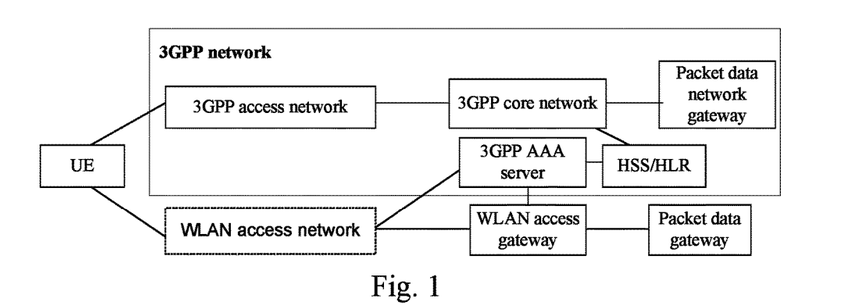
FIG. 1 is an architecture diagram of an interworking protocol in the related art.

On such a premise, some operating companies and enterprises have proposed to merge a WLAN and an existing 3GPP access network to implement joint transmission and fulfil the aims of offloading the existing 3GPP access network and improving network performance by virtue of the WLAN. A related protocol for interworking of the 3GPP access network and the WLAN has been formulated at present. FIG. 1 is an architecture diagram of an interworking protocol in a related art. As shown in FIG. 1, in an interworking WLAN architecture of the 3GPP, it is allowed that the WLAN use an Authentication Authorization Accounting (AAA) server in the 3GPP access network for unified authentication and authorization, a packet data network gateway in the existing 3GPP access network may also be multiplexed as a packet data gateway of the WLAN, and in addition, unified accounting, charging and the like of the two networks may also be implemented to achieve loose coupling of the two networks.

However, there are also some shortcomings in a current interworking architecture, and for example, the current interworking is triggered by UE, a 3GPP network side may not control a target access network, and although a network element Access Network Discovery Support Function (ANDSF) of a core network side may give some strategic rules, these rules are relatively static and the 3GPP network side loses control over access network selection of the UE, which may cause the problem that an access network selected by the UE may not meet a requirement of the UE on Quality of Service (QoS), or may cause frequent handover of the UE between the 3GPP access network and the WLAN to influence user experiences and simultaneously increase an unnecessary network load.

Figure 2:
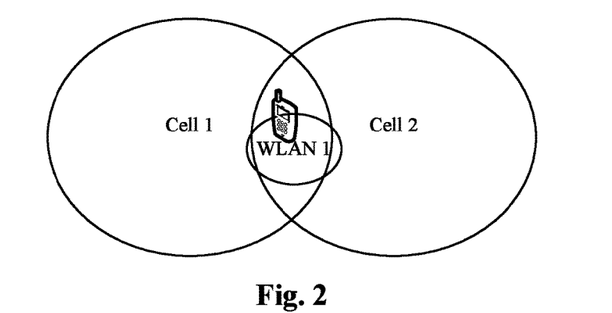
FIG. 2 is a diagram of a scenario of offloading between a 3GPP access network and a WLAN in a handover process in the related art.

Therefore, it is necessary for the 3GPP access network to participate in network selection of the UE to control to a certain extent or completely handover or offloading of the UE between the 3GPP access network and the WLAN at present. FIG. 2 is a diagram of a scenario of offloading between a 3GPP access network and a WLAN in a handover process in the related art. As shown in FIG. 2, UE is located in coverage of two cells Cell 1 and Cell 2 of the 3GPP, and in addition, there is also a WLAN called WLAN 1 deployed by an operator in the coverage of Cell 1 and Cell 2. If the UE is being handed over from Cell 1 to Cell 2, the UE is preparing to offload part of or all services to the WLAN according to a threshold or strategy provided by Cell 1, but Cell 2 may not support a function of handover or offloading between the 3GPP access network and the WLAN, or Cell 2 supporting the function has a threshold or strategy different from that of Cell 1, offloading processing performed by the UE may not work after the UE is successfully handed over to Cell 2 if the UE continues performing offloading processing according to the threshold or strategy provided by Cell 1, which may cause waste of energy of the UE as well as resource waste. If Cell 2 does not support the function of handover or offloading with the WLAN but Cell 1 does not know that, it is impossible for services which have been offloaded to the WLAN after the UE is handed over to Cell 2 to return to Cell 2, which may cause influence on user experiences.

At present, there is some equipment which supports that a base station of a 3GPP access network and an Access Point (AP) of a WLAN belong to the same station, then the base station of the 3GPP access network may acquire real-time information of the WLAN belonging to the same station, and the information may help the equipment to shorten WLAN scanning time and save energy consumption of the equipment; and a 3GPP access network which does not belong to the same station with the WLAN may usually acquire WLAN deployment under coverage through Operation and Maintenance (O&M) configuration, but the O&M configuration updating period is longer, and the real-time information of the WLAN may not be acquired, which may cause UE energy waste due to lack of interaction of network environment information.

Therefore, there exists energy and network resource waste during service operation of UE due to lack of interaction of network environment information of the UE in the related art.

SUMMARY

A method and device for processing Information interaction, offloading processing method and device, a base station, an RNC and UE are provided in the embodiment, so as to at least solve the problem of UE energy and network resource waste during service operation of UE due to lack of interaction of network environment information of the UE in the related art.

According to one aspect of the present disclosure, a method for processing information interaction is provided, and the method comprises: receiving, by a target side network element for handover of User Equipment (UE) at least one of following source side information sent by a source side network element: Wireless Local Area Network (WLAN) auxiliary information, offloading rule information, WLAN measurement report information, offloading decision information and information indicating a capability in supporting interoperation with a WLAN; and/or, sending, by a target side network element, at least one of following target side information to the source side network element: WLAN auxiliary information, load information, offloading rule information, measurement configuration information, offloading decision information and information indicating a capability in supporting interoperation with the WLAN.

In an example embodiment, the WLAN auxiliary information comprises at least one of: WLAN list information in cell coverage, maximum resource allocation which is able be provided for the UE by a Radio Access Network (RAN), WLAN threshold information and RAN threshold information.

In an example embodiment, the offloading rule information comprises at least one of: a priority of information between an RAN and an Access Network Discovery Support Function (ANDSF), a selection priority between the WLAN and an RAN, a method for using a WLAN threshold and a method for using a RAN threshold.

In an example embodiment, the WLAN measurement report information comprises at least one of: signal quality, measured by the UE, of the WLAN; signal strength, measured by the UE, of the WLAN; a load, measured by the UE, of the WLAN; and a Wide Area Network (WAN), index measured by the UE.

In an example embodiment, the offloading decision information comprises at least one of: information indicating the UE to execute offloading from the RAN to the WLAN, information indicating the UE to execute offloading from the WLAN to the RAN, decision information of offloading a part of services of the UE in the RAN to the WLAN, decision information of offloading all the services of the UE in the RAN to the WLAN, decision information of offloading a part of services of the UE in the WLAN to the RAN, decision information of offloading all the services of the UE in the WLAN to the RAN, decision information of offloading a part of bearers of the UE in the RAN to the WLAN, decision information of offloading all the bearers of the UE in the RAN to the WLAN, decision information of offloading a part of bearers of the UE in the WLAN to the RAN and decision information of offloading all the bearers of the UE in the WLAN to the RAN.

In an example embodiment, the measurement configuration information comprises at least one of: information of a triggering event of a measurement report, identification information of an alternative WLAN to be measured, information of a reporting period of a measurement report and information of range of content carried in a measurement report.

In an example embodiment, the target side network element for handover of the UE receives the source side information sent by the source side network element in at least one of manners as follows: X2 interface signalling, S1 interface signalling, Iur interface signalling, a manner of forwarding through a Mobility Management Entity (MME), a manner of forwarding through a Service General Packet Radio Service Supporting Node (SGSN), a manner of forwarding through the MME and the SGSN and a manner of forwarding through the SGSN and the MME; and/or, the target side network element sends the target side information to the source side network element in at least one of manners as follows: X2 interface signalling, S1 interface signalling, Iur interface signalling, a manner of forwarding through an MME, a manner of forwarding through an SGSN, a manner of forwarding through the SGSN and the MME and a manner of forwarding through the MME and the SGSN.

According to another aspect of the embodiment, an offloading processing method is provided, and the method comprises: receiving, by User Equipment (UE), at least one of following target side information sent by a target side network element of handover of the UE: Wireless Local Area Network (WLAN) auxiliary information, load information, offloading rule information, measurement configuration information and offloading decision information; and executing, by the UE, offloading processing according to at least one of the target side information.

In an example embodiment, executing, by the UE, offloading processing according to at least one of the target side information comprises at least one of the followings: performing WLAN measurement according to at least one of the following target side information: the WLAN auxiliary information and the WLAN measurement configuration information; reporting a measurement report according to at least one of the following target side information: the WLAN auxiliary information and the WLAN measurement configuration information; determining an offloading decision according to at least one of the following target side information: the WLAN auxiliary information, the load information and the offloading rule information; and performing offloading according to a determined offloading decision.

According to one aspect of the embodiment, a device for processing an information interaction is provided, and the method comprises: a first receiving component, configured for a target side network element for handover of User Equipment (UE) to receive at least one of following source side information sent by a source side network element: Wireless Local Area Network (WLAN) auxiliary information, offloading rule information, WLAN measurement report information, offloading decision information and information indicating a capability in supporting interoperation with a WLAN; and/or, a sending component, configured for the target side network element to send at least one of following target side information to the source side network element: WLAN auxiliary information, load information, offloading rule information, measurement configuration information, offloading decision information and information indicating a capability in supporting interoperation with the WLAN.

According to another aspect of the embodiment, a base station is provided, and the device comprises the device for processing an information interaction as mentioned in above.

According to the other aspect of the embodiment, a Radio Network Controller, RNC is provided, and the RNC comprises the device for processing an information interaction as mentioned in above.

According to one as one aspect of the embodiment, an offloading processing device is provided, and the device comprises: a second receiving component, configured for User Equipment (UE) to receive at least one of the following target side information sent by a target side network element of handover of the UE: Wireless Local Area Network (WLAN) auxiliary information, load information, offloading rule information, measurement configuration information and offloading decision information; and an executing component, configured for the UE to execute offloading processing according to at least one of the target side information.

According to an example embodiment, the executing component comprises at least one of: a measurement element, configured to perform WLAN measurement according to at least one of the following target side information: the WLAN auxiliary information and the WLAN measurement configuration information; a reporting element, configured to report a measurement report according to at least one of the following target side information: the WLAN auxiliary information and the WLAN measurement configuration information; a determining element, configured to determine an offloading decision according to at least one of the following target side information: the WLAN auxiliary information, the load information and the offloading rule information; and an offloading element, configured to perform offloading according to a determined offloading decision.

According to another aspect of the embodiment, User Equipment, UE is provided, and the UE comprises the offloading processing device as mentioned in above.

According to the present disclosure, the target side network element for handover of the UE receives at least one of the following source side information sent by the source side network element: the WLAN auxiliary information, the offloading rule information, the WLAN measurement report information, the offloading decision information and the information indicating the capability in supporting interoperation with the WLAN; and/or, the target side network element sends at least one of the following target side information to the source side network element: the WLAN auxiliary information, the load information, the offloading rule information, the measurement configuration information, the offloading decision information and the information indicating the capability in supporting interoperation with the WLAN, so that the problem of UE energy and network resource waste during service operation of the UE due to lack of interaction of the network environment information of the UE in the related art is solved, and the effect of saving UE energy and network resources is further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments can be combined under the condition of no conflicts.

Figure 3:
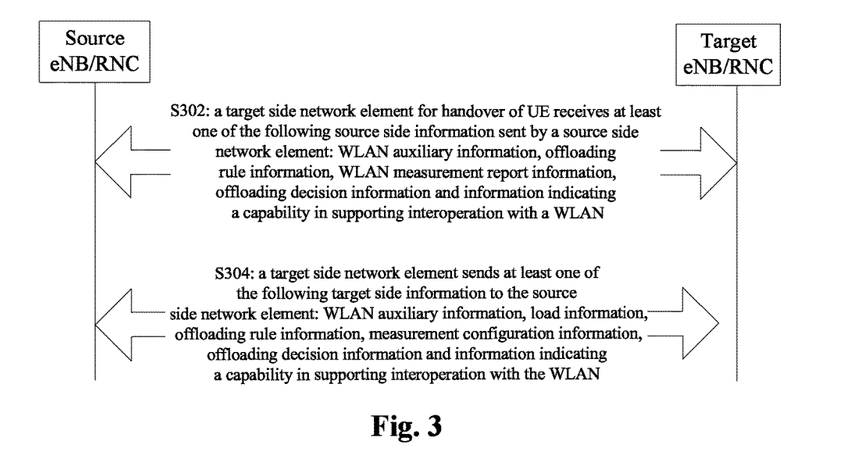
FIG. 3 is a flowchart of a method for processing information interaction according to an embodiment of the present disclosure.

A method for processing information interaction is provided in the embodiment. FIG. 3 is a flowchart of a method for processing information interaction according to an embodiment of the present disclosure, and as shown in FIG. 3, the flow includes the following steps:

Step 302: a target side network element for handover of UE receives at least one of the following source side information sent by a source side network element: WLAN auxiliary information, offloading rule information, WLAN measurement report information, offloading decision information and information indicating a capability in supporting interoperation with a WLAN; and/or, Step 304: a target side network element sends at least one of the following target side information to the source side network element: WLAN auxiliary information, load information, offloading rule information, measurement configuration information, offloading decision information and information indicating a capability in supporting interoperation with the WLAN.

By the steps, a source side sends network environment information of the source side (i.e. the source side information) of the UE to a target side, and the target side sends network environment information of the target side (i.e. the target side information) to the source side, so that interaction of the network environment information of the UE is implemented, unnecessary operation of the UE is avoided, the problem of UE energy and network resource waste during service operation of the UE due to lack of interaction of the network environment information of the UE in the related art is solved, and the effects of saving UE energy and network resources and improving a user experience are further achieved.

Wherein, the WLAN auxiliary information may include at least one of: WLAN list information in cell coverage, maximum resource allocation which may be provided for the UE by a RAN, WLAN threshold information and RAN threshold information. The offloading rule information may include at least one of: a priority of information between an RAN and an ANDSF, a selection priority between the WLAN and an RAN, a method for using a WLAN threshold and a method for using a RAN threshold. The WLAN measurement report information may include at least one of: signal quality, measured by the UE, of the WLAN; signal strength, measured by the UE, of the WLAN; a load, measured by the UE, of the WLAN and a WAN index measured by the UE.

In an optional example, the offloading decision information may include at least one of: information indicating the UE to execute offloading from the RAN to the WLAN, information indicating the UE to execute offloading from the WLAN to the RAN, decision information of offloading a part of services of the UE in the RAN to the WLAN, decision information of offloading all the services of the UE in the RAN to the WLAN, decision information of offloading a part of services of the UE in the WLAN to the RAN, decision information of offloading all the services of the UE in the WLAN to the RAN, decision information of offloading a part of bearers of the UE in the RAN to the WLAN, decision information of offloading all the bearers of the UE in the RAN to the WLAN, decision information of offloading a part of bearers of the UE in the WLAN to the RAN and decision information of offloading all the bearers of the UE in the WLAN to the RAN.

In an optional example, the measurement configuration information may include at least one of: information of a triggering event of a measurement report, identification information of an alternative WLAN to be measured, information of a reporting period of a measurement report and information of range of content carried in a measurement report.

In an optional example, the target side network element for handover of the UE may receive the source side information sent by the source side network element in at least one of manners as follows: X2 interface signalling, S1 interface signalling, Iur interface signalling, a manner of forwarding through an MME, a manner of forwarding through an SGSN, a manner of forwarding through the MME and the SGSN and a manner of forwarding through the SGSN and the MME; and/or, the target side network element sends the target side information to the source side network element in at least one of manners as follows: X2 interface signalling, S1 interface signalling, Iur interface signalling, a manner of forwarding through the MME, a manner of forwarding through the SGSN, a manner of forwarding through the SGSN and the MME and a manner of forwarding through the MME and the SGSN.

Figure 4:
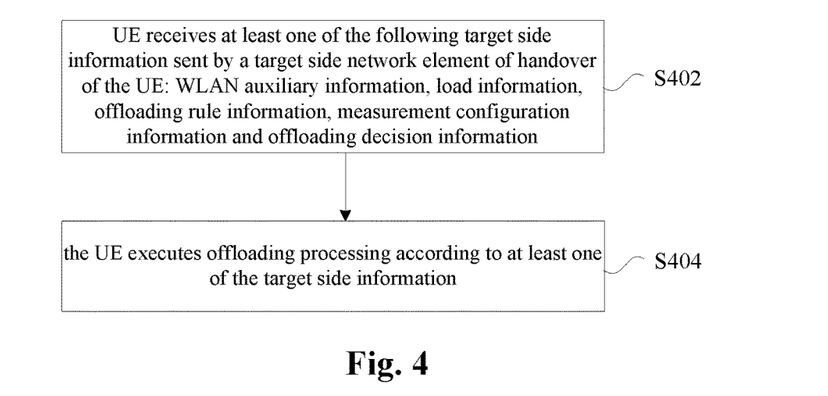
FIG. 4 is a flowchart of an offloading processing method according to an embodiment of the present disclosure.

An offloading processing method is further provided in the embodiment. FIG. 4 is a flowchart of an offloading processing method according to an embodiment of the present disclosure, and as shown in FIG. 4, the flow includes the following steps:

Step 402: UE receives at least one of the following target side information sent by a target side network element of handover of the UE: WLAN auxiliary information, load information, offloading rule information, measurement configuration information and offloading decision information; and Step 404: the UE executes offloading processing according to at least one of the target side information.

By the steps, the UE may receive network environment information of a target side (i.e. the target side information), and for the problem of unreasonable offloading processing or inaccurate handover caused by incapability in estimating a network environment of the target side to which the UE is handed over during offloading processing due to lack of interaction of the network environment information in the related art, the UE effectively implements interaction of the network environment information according to the acquired target side information, so that the problem of UE energy and network resource waste during service operation of the UE due to lack of interaction of the network environment information of the UE in the related art is solved, and the effects of saving UE energy and network resources and improving a user experience are further achieved.

In an optional example, the step that the UE executes offloading processing according to the target side information includes various contents, and for example, may include at least one of the following steps: WLAN measurement is performed according to at least one of the following target side information: the WLAN auxiliary information and the WLAN measurement configuration information; a measurement report is reported according to at least one of the following target side information: the WLAN auxiliary information and the WLAN measurement configuration information; an offloading decision is determined according to at least one of the following target side information: the WLAN auxiliary information, the load information and the offloading rule information; and offloading is performed according to the determined offloading decision.

A device for processing information interaction and an offloading processing device are further provided in the embodiment. The devices are configured to implement the abovementioned embodiment and example implementation mode, and that what has been described will not be elaborated. For example, a term "component", used below, is a combination of software and/or hardware capable of realizing a preset function. The device described in the following embodiment is preferably implemented by software, but implementation of the device with hardware or a combination of software and hardware is also possible and conceivable.

Figure 5:
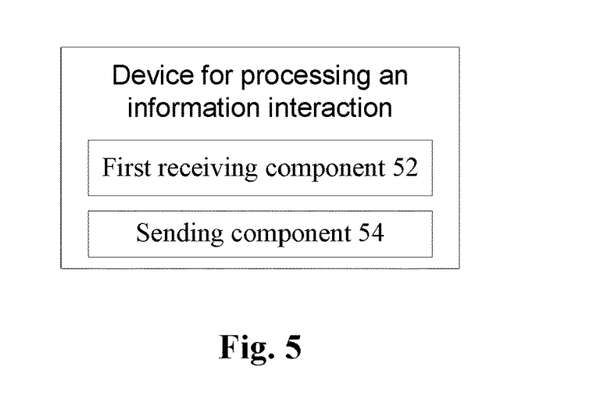
FIG. 5 is a structure diagram of a device for processing information interaction according to an embodiment of the present disclosure.

FIG. 5 is a structure diagram of a device for processing information interaction according to an embodiment of the present disclosure, and as shown in FIG. 5, the device includes a first receiving component 52 and/or a sending component 54. The device is described below.

The first receiving component 52 is configured for a target side network element for handover of UE to receive at least one of the following source side information sent by a source side network element: WLAN auxiliary information, offloading rule information, WLAN measurement report information, offloading decision information and information indicating a capability in supporting interoperation with a WLAN; and/or, the sending component 54 is configured for the target side network element to send at least one of the following target side information to the source side network element: WLAN auxiliary information, load information, offloading rule information, measurement configuration information, offloading decision information and information indicating a capability in supporting interoperation with the WLAN.

Figure 6:
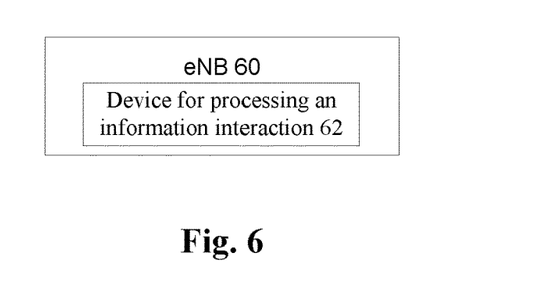
FIG. 6 is a structure diagram of a base station according to an embodiment of the present disclosure.

FIG. 6 is a structure diagram of a base station according to an embodiment of the present disclosure, and as shown in FIG. 6, the base station 60 includes the abovementioned device for processing information interaction 62.

Figure 7:
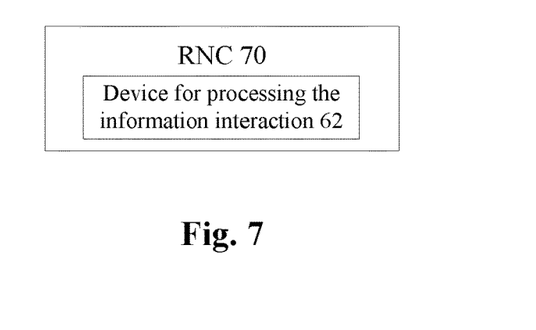
FIG. 7 is a structure diagram of an RNC according to an embodiment of the present disclosure.

FIG. 7 is a structure diagram of an RNC according to an embodiment of the present disclosure, and as shown in FIG. 7, the RNC 70 includes the abovementioned device for processing information interaction 62.

Figure 8:
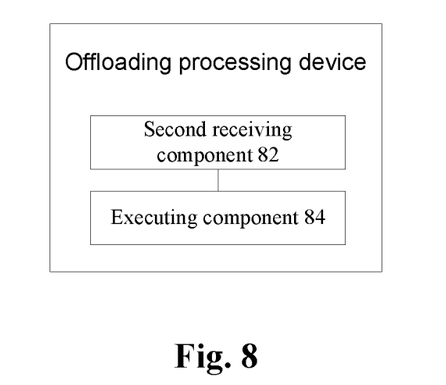
FIG. 8 is a structure diagram of an offloading processing device according to an embodiment of the present disclosure.

FIG. 8 is a structure diagram of an offloading processing device according to an embodiment of the present disclosure, and as shown in FIG. 8, the device includes: a second receiving component 82 and an executing component 84. The device is described below.

The second receiving component 82 is configured for UE to receive at least one of the following target side information sent by a target side network element of handover of the UE: WLAN auxiliary information, load information, offloading rule information, measurement configuration information and offloading decision information; and the executing component 84 is connected to the second receiving component 82, and is configured for the UE to execute offloading processing according to at least one of the target side information.

Figure 9:
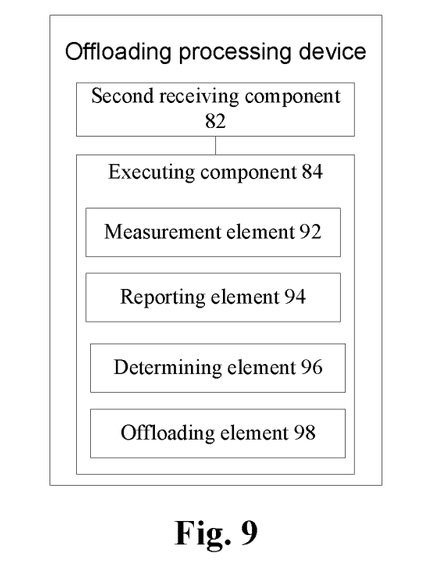
FIG. 9 is an example structure diagram of the executing component 84 in the offloading processing device according to an embodiment of the present disclosure.

FIG. 9 is an example structure diagram of the executing component 84 in the offloading processing device according to an embodiment of the present disclosure, and as shown in FIG. 9, the executing component 84 includes at least one of: a measurement element 92, a reporting element 94, a determining element 96 and an offloading element 98. The executing component 84 is described below.

The measurement element 92 is configured to perform WLAN measurement according to at least one of the following target side information: the WLAN auxiliary information and the WLAN measurement configuration information; the reporting element 94 is configured to report a measurement report according to at least one of the following target side information: the WLAN auxiliary information and the WLAN measurement configuration information; the determining element 96 is configured to determine an offloading decision according to at least one of the following target side information: the WLAN auxiliary information, the load information and the offloading rule information; and the offloading element 98 is configured to perform offloading according to the determined offloading decision.

Figure 10:
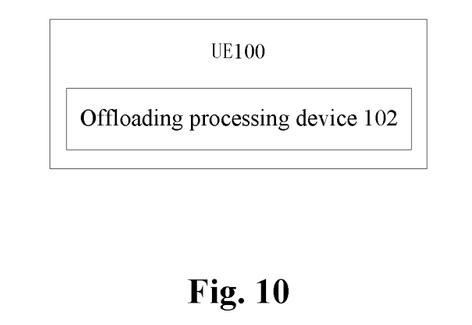
FIG. 10 is a structure diagram of UE according to an embodiment of the present disclosure.

UE is further provided in the embodiment. FIG. 10 is a structure diagram of UE according to an embodiment of the present disclosure, and as shown in FIG. 10, the UE 100 includes the offloading processing device 102 in any above-mentioned item.

For resource waste probably caused by offloading between a 3GPP access network and a WLAN in a handover process in the related art, a method for processing a handover is provided in the embodiment, which includes that: a source base station or a source RNC (such as the above-mentioned source side) sends at least one of the following information of a source cell to a target base station or a target RNC (the target side): WLAN auxiliary information, an offloading rule, a WLAN related measurement report reported by UE, an offloading decision and an indicator for indicating a capability in supporting interoperation with a WLAN; and the target base station or the target RNC sends at least one of the following information to the source base station or the source RNC as a response: WLAN auxiliary information of a target cell, load information, an offloading rule, measurement configuration, an offloading decision and an indicator for indicating a capability in supporting interoperation with the WLAN of the target side.

Wherein, the WLAN auxiliary information may include at least one of: a WLAN list in cell coverage; maximum resource allocation which may be provided for the UE by a RAN side; a WLAN threshold; and a RAN threshold.

The offloading rule may include at least one of: a priority of information between an RAN side and an ANDSF; a selection priority between the WLAN and an RAN; a method for using a WLAN threshold; and a method for using a RAN threshold.

The WLAN related measurement report reported by the UE may include at least one of: signal quality and/or signal strength, measured by the UE, of the WLAN; a load, measured by the UE, of the WLAN; and a WAN index measured by the UE.

The offloading decision may include at least one of: information indicating the UE to execute offloading from the RAN to the WLAN; information indicating the UE to execute offloading from the WLAN to the RAN; decision information of offloading a part of or all services or bearers of the UE in the RAN to the WLAN; and decision information of offloading a part of or all services or bearers of the UE in the WLAN to the RAN.

The measurement configuration may include at least one of: a triggering event of a measurement report; identifier of an alternative WLAN to be measured; a report reporting period of a measurement; and a range of content carried in a measurement report.

In an optional example, the source base station or the source RNC sends a response content of the target side to the UE after receiving the response of the target side.

In an optional example, the UE performs WLAN measurement and reports the measurement report according to the WLAN auxiliary information and/or WLAN measurement configuration of the target side.

In an optional example, the UE determines the offloading decision according to the WLAN auxiliary information and/or load information and/or offloading rule of the target side.

In an optional example, the UE performs offloading according to the offloading decision of the target side.

Wherein, it is important to note that the source side may send the source side information to the target side in multiple manners and the target side may also send the target side information to the source side in multiple manners. Some example manners are described below.

For example, the source base station may send at least one of the following information of the source side to the target base station in at least one of manners of X2 interface signalling, S1 signalling and forwarding through an MME: the WLAN auxiliary information of the source side, the offloading rule, the WLAN related measurement report reported by the UE, the offloading decision and the indicator for indicating the capability in supporting interoperation with the WLAN.

Similarly, the target base station may also send at least one of the following target side information to the source base station as a response in at least one of manners of X2 interface signalling, S1 signalling, and forwarding through the MME: the WLAN auxiliary information of the target side, the load information of the target side, the offloading rule, the measurement configuration, the offloading decision and the indicator for indicating the capability in supporting interoperation with the WLAN.

For another example, the source RNC may send at least one of the following information of the source side to the target RNC in manners of Iur interface signalling or forwarding through an SGSN: the WLAN auxiliary information of the source side, the offloading rule, the WLAN related measurement report reported by the UE, the offloading decision and the indicator for indicating the capability in supporting interoperation with the WLAN.

Similarly, the target RNC may also send at least one of the following information of the target side to the source RNC as a response in manners of Iur interface signalling or forwarding through the SGSN: the WLAN auxiliary information, the load information of the target side, the offloading rule, the measurement configuration, the offloading decision and the indicator for indicating the capability in supporting interoperation with the WLAN.

For another example: the source base station may send at least one of the following information of the source side to the target RNC in a manner of forwarding through the MME and the SGSN: the WLAN auxiliary information, the offloading rule, the WLAN related measurement report reported by the UE, the offloading decision and the indicator for indicating the capability in supporting interoperation with the WLAN.

Similarly, the target RNC may also send at least one of the following information of the target side to the source base station as a response in a manner of forwarding through the SGSN and the MME: the WLAN auxiliary information, the load information of the target side, the offloading rule, the measurement configuration, the offloading decision and the indicator for indicating the capability in supporting interoperation with the WLAN.

For another example, the source RNC may send at least one of the following information of the source cell to the target base station in the manner of forwarding through the SGSN and the MME: the WLAN auxiliary information, the offloading rule, the WLAN related measurement report reported by the UE, the offloading decision and the indicator for indicating the capability in supporting interoperation with the WLAN.

Similarly, the target base station may also send at least one of the following information of the target side to the source RNC as a response in the manner of forwarding through the MME and the SGSN: the WLAN auxiliary information, the load information of the target side, the offloading rule, the measurement configuration, the offloading decision and the indicator for indicating the capability in supporting interoperation with the WLAN.

Example implementation modes of the embodiment are described below with reference to the drawings.

Figure 11:
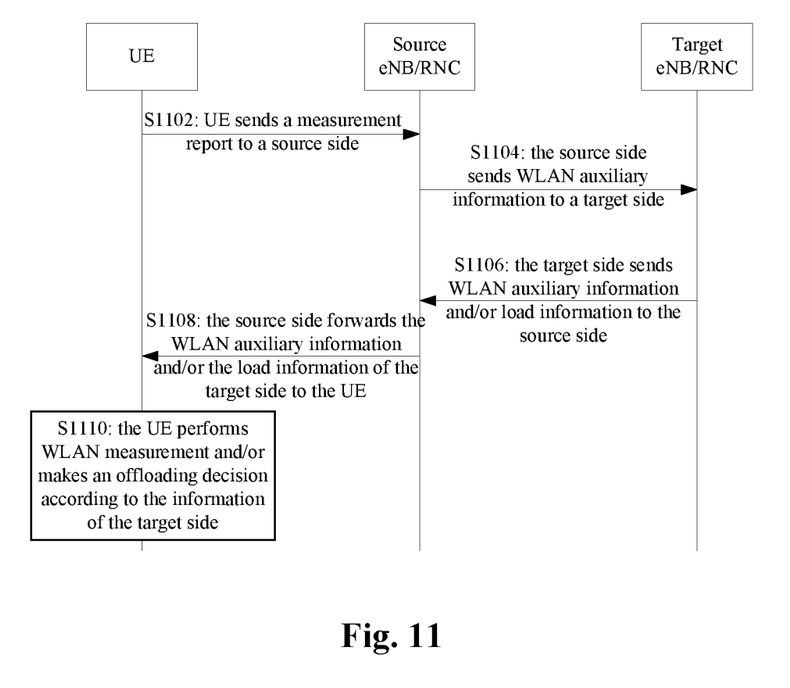
FIG. 11 is a flowchart of a first example implementation mode according to the present disclosure.

FIG. 11 is a flowchart of a first example implementation mode according to the present disclosure, and as shown in FIG. 11, the flow includes the following steps:

Step 1102: UE sends a measurement report to a source side.

In the related art, a RAN side may configure some measurements for the UE to monitor the quality of link between a serving cell and the UE, and the quality of link between a neighbouring cell and the UE, and when the neighbouring cell is monitored to be more suitable to provide service for the UE compared with the serving cell, the source side may configure handover for the UE. The measurement report is an important basis for the RAN side to judge whether to perform handover on the UE or not.

Wherein, the measurement report may be an event-triggered measurement report, may also be a periodically-triggered measurement report, and is a measurement report supported by an existing network of a 3 GPP system.

Step 1104: the source side sends WLAN auxiliary information to a target side.

When the RAN side is an Evolved Universal Terrestrial Radio Access Network (EUTRAN), the source side and/or the target side may refer to eNBs/an eNB, and when the RAN side is a Universal Mobile Telecommunication System Radio Access Network (UTRAN), the source side and/or the target side refer/refers to RNCs/an RNC.

When the source side considers that the UE should execute handover at this time after receiving the measurement report sent by the UE, the source side may look for a proper target cell for the UE, the source side may send to a target side a handover request message or a relocation request message, and the source side may carry WLAN auxiliary information of a source cell in the handover request message or the relocation request message.

The WLAN auxiliary information includes at least one of: a WLAN list in cell coverage; maximum resource allocation which may be provided for the UE by the RAN side; a WLAN threshold; and a RAN threshold.

Wherein, the WLAN list in the cell coverage at least includes an identifier of a WLAN, and may also include frequency information and the like of the WLAN.

The maximum resource allocation which may be provided for the UE by the RAN side refers to maximum resource allocation which may be provided for the UE by a RAN side of an LTE system/Universal Mobile Telecommunication System (UMTS), and may be represented by a parameter such as a Resource Block (RB) or a transmission rate.

The WLAN threshold may be a signal threshold of the WLAN or a load threshold of the WLAN or the like, and for example, an offloading rule sent to the UE by an ANDSF includes that a service or bearer in a RAN may be offloaded to the WLAN when a WLAN signal is higher than the signal threshold of the WLAN and/or a load of the WLAN is lower than the load threshold of the WLAN and that a service or bearer in the WLAN may be offloaded to the RAN when the WLAN signal is lower than the signal threshold of the WLAN and/or the load of the WLAN is higher than the load threshold of the WLAN; and the RAN side may configure specific thresholds.

The RAN threshold may be a signal threshold of the RAN, and/or a load threshold of the RAN and the like, and for example, the offloading rule sent to the UE by the ANDSF includes that the service or bearer in the RAN may be offloaded to the WLAN when a RAN signal is lower than the signal threshold of the RAN and/or a load of the RAN is higher than the load threshold of the RAN and the WLAN signal is higher than the signal threshold of the WLAN; and the RAN side may configure specific thresholds.

In an optional example, the source side sends the WLAN auxiliary information to the target side in at least one of manners as follows: X2 interface signalling, S1 signalling, forwarding through an MME, Iur interface signalling, forwarding through an SGSN and forwarding through the MME and the SGSN.

Step 1106: the target side sends WLAN auxiliary information and/or load information to the source side.

The target side receives the WLAN auxiliary information sent by the source side, and sends WLAN auxiliary information and/or load information of the target cell to the source side through a handover request acknowledge message or a relocation request acknowledge message, and the target side may know that the source side supports a 3GPP and WLAN interoperation function after receiving the WLAN auxiliary information sent by the source side, and sends the WLAN auxiliary information and/or load information of the target cell to the source side to help the source side to obtain more information about the target side and help the source side to make a proper handover decision.

In an optional example, the target side may send the WLAN auxiliary information and/or the load information to the target side in at least one of manners as follows: X2 interface signalling, S1 signalling, forwarding through the MME, Iur interface signalling, forwarding through the SGSN and forwarding through the SGSN and the MME.

Step 1108: the source side forwards the WLAN auxiliary information and/or load information of the target side to the UE.

The source side may forward the WLAN auxiliary information and/or load information of the target side in a handover command message to the UE to notify the UE of some information of the target side in advance to help the UE to make a more reasonable offloading decision.

Step 1110: the UE performs WLAN measurement and/or makes an offloading decision according to the information of the target side.

The UE may stop performing WLAN measurement according to the WLAN auxiliary information of the source side after receiving the WLAN auxiliary information and/or load information of the target side, may perform measurement according to the WLAN auxiliary information of the target side, and may make the offloading decision according to the WLAN auxiliary information and/or load information of the target side. Since the UE is immediately disconnected from the source side, the information of the target side is more reasonably used.

Figure 12:
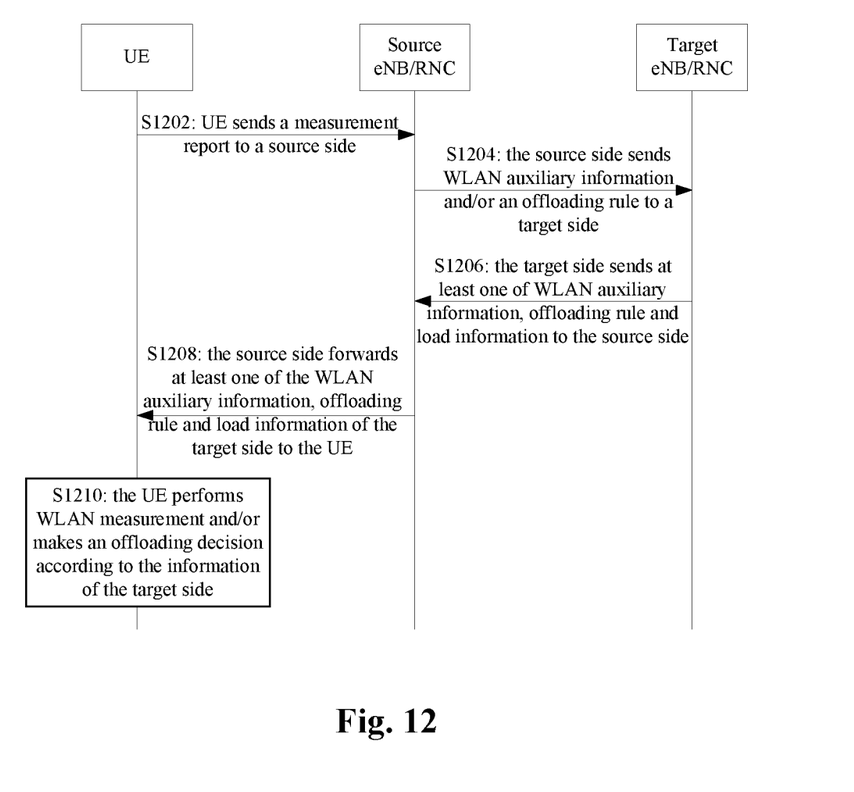
FIG. 12 is a flowchart of a second example implementation mode according to the present disclosure.

FIG. 12 is a flowchart of a second example implementation mode according to the present disclosure, and as shown in FIG. 12, the flow includes the following steps:

Step 1202: UE sends a measurement report to a source side (the same as Step 1102).

Step 1204: the source side sends WLAN auxiliary information and/or an offloading rule to a target side.

Wherein, the WLAN auxiliary information is the same as that mentioned above, and will not be elaborated herein.

The offloading rule may include at least one of: a priority of information between an RAN side and an ANDSF; a selection priority of a WLAN and an RAN; a method for using a WLAN threshold given by a network side; and a method for using an RAN threshold given by the network side.

A network element ANDSF of a core network side may provide access network discovery information for the UE, and the access network discovery information provided by the ANDSF is an access network list, and includes an access network type, a radio access network identifier and other specific access technology information such as carrier frequency information and a validity condition. Once the UE requests, the ANDSF may provide an available access network list related to all access technology types requested by the UE. The access network discovery information provided for the UE by the ANDSF includes: the access technology types such as WLAN, Worldwide Interoperability for Microwave Access (WiMAX) and an RNC identifier such as a Service Set Identifier (SSID) of the WLAN, other specific access technology information such as carrier frequency information may be provided, and some validity conditions may also be set to indicate that a piece of access network discovery information which is provided is valid under a corresponding condition such as a location. An Inter-System Mobility Policy (ISMP) includes priorities of different Radio Access Technologies (RATs), priorities of different RANs of the same RAT and some limit information, for example, content such as time when handover of a certain RAT to another RAT is not allowed or such handover is not allowed all the time. The access network discovery information includes RANs probably existing in the vicinity of the UE, including information of identifiers, locations and the like of the RANs. An Inter-System Routing Policy (ISRP) includes the content such as which RATs are best for Internet Protocol (IP) flows or Public Data Network (PDN) connections, and which RATs are forbidden to the IP flows or the PDN connections, when the UE may be simultaneously connected to two RATs. When the UE supports simultaneous passage of an IP route through multiple radio access interfaces, the ANDSF may provide an ISRP list for the UE, and the UE may determine time ranges and access technology types/access networks limited within the time ranges for specific IP flows or specific APNs and select the most proper access technology types/access networks or Access Point Names (APNs) for IP flow routing after the UE is matched with a certain condition: a specific APN or a specific IP flow or some specific application filter rules according to the ISRPs.

But the information of the ANDSF is relatively static and does not consider some practical load conditions, radio link conditions and the like of the RAN side, so that the RAN side may give some more dynamic information, and at this time, the UE may not judge which information to use when the UE simultaneously receives the information of the RAN side and the ANDSF and the information has a certain conflict. Therefore, the RAN side may provide the priority of the information between the RAN side and the ANDSF.

The selection priority of the WLAN and the RAN refer to the selection priority of the WLAN and the RAN, or the priority of the WLAN, the EUTRAN and the UTRAN when the UE selects accessing.

The method for using WLAN threshold given by the network side refers to that the RAN may provide a WLAN threshold for the UE in the WLAN auxiliary information, and how to specifically use is also told to the UE, for example: a service or bearer in the RAN may be offloaded to the WLAN when a WLAN signal is higher than a signal threshold of the WLAN and/or a load of the WLAN is lower than a load threshold of the WLAN; or a service or bearer in the WLAN may be offloaded to the RAN when the WLAN signal is lower than the signal threshold of the WLAN and/or the load of the WLAN is higher than the load threshold of the WLAN.

The method for using the RAN threshold given by the network side refers to that the RAN may provide a RAN threshold for the UE in the WLAN auxiliary information, and how to specifically use is also told to the UE, for example: the service or bearer in the RAN may be offloaded to the WLAN when a RAN signal is lower than a signal threshold of the RAN and/or a load of the RAN is higher than a load threshold of the RAN and the WLAN signal is higher than the signal threshold of the WLAN; or the service or bearer in the WLAN may be offloaded to the RAN when the RAN signal is higher than the signal threshold of the RAN and/or the load of the RAN is lower than the load threshold of the RAN.

In an optional example, the source side may send the WLAN auxiliary information and/or an offloading decision to the target side in at least one of manners as follows: X2 interface signalling, S1 signalling, forwarding through an MME, Iur interface signalling, forwarding through an SGSN and forwarding through the MME and the SGSN.

Step 1206: the target side sends at least one of WLAN auxiliary information, offloading rule and load information to the source side.

In an optional example, the target side may send at least one of the WLAN auxiliary information, the offloading rule, the load information to the source side in at least one of manners as follows: X2 interface signalling, S1 signalling, forwarding through the MME, Iur interface signalling, forwarding through the SGSN and forwarding through the SGSN and the MME.

Step 1208: the source side forwards at least one of the WLAN auxiliary information, offloading rule and load information of the target side to the UE.

The source side may forward at least one of the WLAN auxiliary information, offloading rule, load information of the target side in a handover command message to the UE to notify the UE of some information of the target side in advance to help the UE to make a more reasonable offloading decision.

Step 1210: the UE performs WLAN measurement and/or makes an offloading decision according to the information of the target side.

The UE may stop performing WLAN measurement according to the WLAN auxiliary information of the source side after receiving the WLAN auxiliary information and/or load information of the target side, may perform measurement according to the WLAN auxiliary information of the target side, and may make the offloading decision according to at least one of the WLAN auxiliary information, offloading rule and load information of the target side. Since the UE is immediately disconnected from the source side, the information of the target side is more reasonably used.

Figure 13:
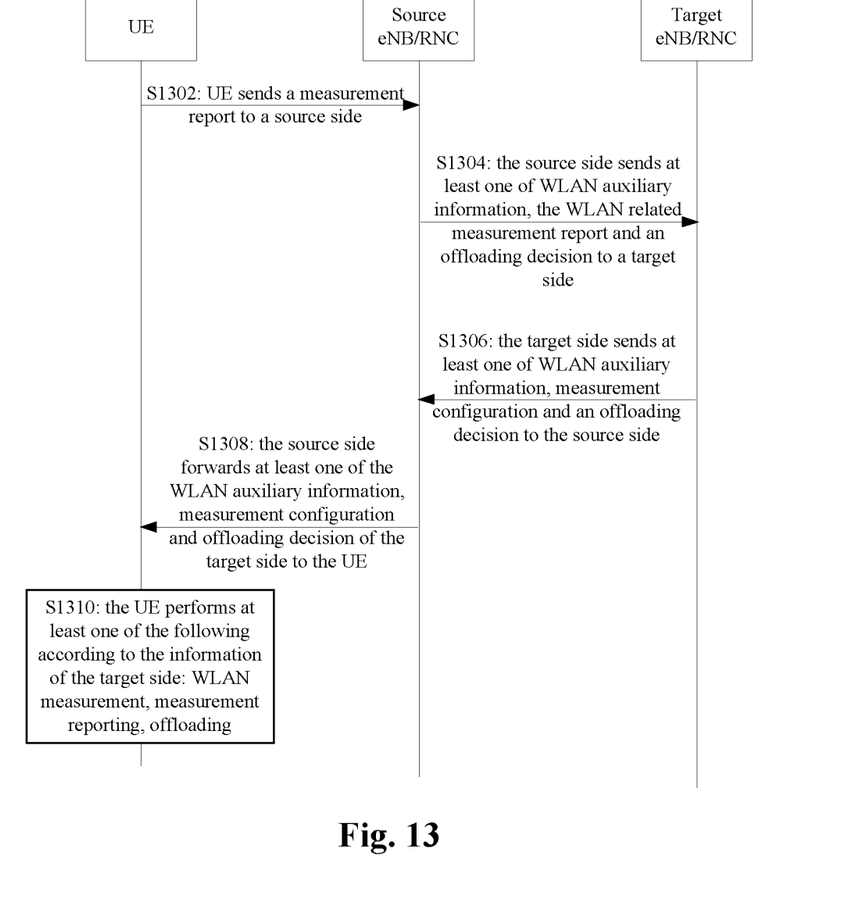
FIG. 13 is a flowchart of a third preferred implementation mode according to the present disclosure.

FIG. 13 is a flowchart of a third example implementation mode according to the present disclosure, and as shown in FIG. 13, the flow includes the following steps:

Step 1302: UE sends a measurement report to a source side.

The measurement may include a measurement result of 3GPP measurement and a measurement result of Inter-RAT measurement, and also include a WLAN related measurement result, wherein the WLAN related measurement result may be a periodic measurement result, and may also be an event-triggered measurement result. A RAN side may make an offloading decision, for example, which WLAN is selected to be offloaded, which part of or all services or bearers is selected to be offloaded, according to the received WLAN related measurement result.

When a signal condition of a current serving cell is worsened and reaches a certain threshold, the UE may report a measurement report triggered by event A3 and a WLAN related measurement report. Wherein, the WLAN related measurement report at least includes: signal strength and signal quality of the WLAN, a load condition of the WLAN and the like.

When a network side performs measurement configuration on the UE and WLAN related measurement is configured for the UE, the UE is required to report a measurement result according to the WLAN related measurement configuration.

The WLAN related measurement report reported by the UE may include at least one of: the signal quality and/or signal strength, measured by the UE, of the WLAN; a load, measured by the UE, of the WLAN; and a WAN index measured by the UE.

Step 1304: the source side sends at least one of WLAN auxiliary information, the WLAN related measurement report and an offloading decision to a target side.

The source side may look for a proper target cell for handover for the UE after receiving the measurement report reported by the UE, and may evaluate whether offloading is required to be executed or not according to the WLAN related measurement report reported by the UE; however, a signal condition of a source cell may also be poorer, or a load of the source cell may also be heavier, and the UE is about to be handed over to the target cell immediately; and therefore, the source side may send the WLAN related measurement result reported by the UE to the target side, and then the target side makes an offloading decision.

The source side may send at least one of the WLAN auxiliary information, the WLAN related measurement report, the offloading decision in a handover request message or a relocation request message to the target side.

The offloading decision may include at least one of: information indicating the UE to execute offloading from a RAN to the WLAN; information indicating the UE to execute offloading from the WLAN to the RAN; decision information of offloading a part of or all services or bearers of the UE in the RAN to the WLAN; and decision information of offloading a part of or all services of the UE in the WLAN to the RAN.

The offloading decision sent to the target side by the source side may be an offloading decision which is determined by the source side and required to be finally executed by the UE, and may also be an alternative offloading decision provided for the target side as a reference, that is, the final offloading decision may be determined by the source side, and may also be determined by the target side.

In an optional example, the source side may send at least one of the following information of the source side to the target side in at least one of manners of X2 interface signalling, S1 signalling, forwarding through an MME, Iur interface signalling, forwarding through an SGSN and forwarding through the MME and the SGSN: the WLAN auxiliary information, WLAN related measurement report and the offloading decision.

Step 1306: the target side sends at least one of WLAN auxiliary information, measurement configuration and an offloading decision to the source side.

The measurement configuration may include at least one of: a triggering event of a measurement report; an identifier of an alternative WLAN to be measured; a reporting period of the measurement report; and a range of content of a measurement report.

The triggering event of the measurement report may include at least one of that: the measurement report is triggered to be reported when the signal quality or signal strength of the WLAN is higher than a certain threshold; the measurement report is triggered to be reported when the signal quality or signal strength of the WLAN is higher than a certain threshold and a load of the WLAN is lower than a certain threshold; the measurement report is triggered to be reported when the signal quality or signal strength of the WLAN is lower than a certain threshold; the measurement report is triggered to be reported when the signal quality or signal strength of the WLAN is lower than a certain threshold and the load of the WLAN is higher than a certain threshold; the measurement report is triggered to be reported when the load of the WLAN is higher than a certain threshold; the measurement report is triggered to be reported when signal quality or signal strength of the RAN is lower than a certain threshold and the signal quality or signal strength of the WLAN is higher than a certain threshold; the measurement report is triggered to be reported when the signal quality or signal strength of the RAN is lower than a certain threshold, the signal quality or signal strength of the WLAN is higher than a certain threshold and the load of the WLAN is lower than a certain threshold; the measurement report is triggered to be reported when the signal quality or signal strength of the RAN is higher than a certain threshold and the signal quality or signal strength of the WLAN is lower than a certain threshold; and the measurement report is triggered to be reported when the signal quality or signal strength of the RAN is higher than a certain threshold, the signal quality or signal strength of the WLAN is lower than a certain threshold and the load of the WLAN is higher than a certain threshold.

The identifier of the alternative WLAN to be measured may include at least one of: a Basic Service Set Identifier (BSSID), an SSID, a Homogenic Extended SSID (HESSID), a domain name list, an operating class and a channel number. Or the identifier of the alternative WLAN to be measured may be determined by a WLAN list in cell coverage in the WLAN auxiliary information.

The reporting period of the measurement report may be a reporting interval at which the UE periodically reports the WLAN related measurement report.

The range of the content of the measurement report includes at least one of: the signal strength of the WLAN, the signal quality of the WLAN, a load condition of the WLAN and an uplink and downlink rate and load condition of a WAN.

In an optional example, the target side may send at least one of the following target side information to the source side in at least one of manners of X2 interface signalling, S1 signalling, forwarding through the MME, Iur interface signalling, forwarding through the SGSN and forwarding through the SGSN and the MME: the WLAN auxiliary information, the measurement configuration information and the offloading decision.

Step 1308: the source side forwards at least one of the WLAN auxiliary information, measurement configuration and offloading decision of the target side to the UE.

The source side may forward at least one of the following target side information of the target side in the handover command message to the UE: the WLAN auxiliary information, the measurement configuration and the offloading decision.

It is important to note that the offloading decision may be made by the source side when the source side sends the offloading decision to the UE.

Step 1310: the UE performs WLAN measurement and measurement reporting and/or performs offloading according to the information of the target side.

Fourth Example Implementation Mode

A source side discovers that there are multiple alternative target cells according to a measurement report reported by UE, and when the source side sends a handover request message or a relocation request message to base stations or RNCs of the multiple alternative target cells, the source side may carry information indicating a capability in supporting interoperation with a WLAN therein to indicate that the source side supports a function of interoperation with the WLAN or indicate that UE currently to be handed over is executing offloading with the WLAN.

The base stations or RNCs of the multiple alternative target cells feed back handover request acknowledge messages or relocation request acknowledge messages to the source side when they can serve the UE after receiving the handover request message or relocation request message sent by the source side. Because the received message carries the information indicating the capability in supporting interoperation with the WLAN, the base stations or RNCs of the alternative target cells may identify the information, sent by the source side, indicating the capability in supporting interoperation with the WLAN when the base stations or RNCs also supports the function of interoperation with the WLAN. Then, the base stations or RNCs of the alternative target cells may carry information indicating a capability in supporting interoperation with the WLAN in the handover request acknowledge message or the relocation request acknowledge message to indicate that they also support the function of interoperation with the WLAN.

The source side preferably selects the alternative target cell supporting the function of interoperation with the WLAN as a target cell of the UE after receiving the handover request acknowledge messages or relocation request acknowledge messages fed back by the base stations or RNCs of the multiple alternative target cells.

Obviously, those skilled in the art should know that each component or step of the embodiment of the present disclosure can be implemented by a universal computing device, and the components or steps can be concentrated on a single computing device or distributed on a network formed by a plurality of computing devices, and can optionally be implemented by programmable codes executable for the computing devices, so that the components or steps can be stored in a storage device for execution with the computing devices, or and under certain conditions, the shown or described steps can be executed in a sequence different from that described here, or the components or steps can form each integrated circuit component respectively, or multiple components or steps therein can form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

From the above, the method and device for processing information interaction and the offloading processing method and device, the base station, the RNC and the UE provided by the embodiment of the present disclosure have beneficial effects as follows: the problem of UE energy and network resource waste during service operation of the UE due to lack of interaction of the network environment information of the UE in the related art is solved, and the effect of saving UE energy and network resources is further achieved.

What is claimed is:

1. A method for processing an information interaction, comprising:
receiving, by a target side network element for handover of User Equipment (UE) at least one of following source side information sent by a source side network element: Wireless Local Area Network (WLAN) auxiliary information, offloading rule information, and information indicating a capability in supporting interoperation with a WLAN; and/or,
sending, by a target side network element, at least one of following target side information to the source side network element: WLAN auxiliary information, load information, offloading rule information, measurement configuration information, offloading decision information and information indicating a capability in supporting interoperation with the WLAN;
wherein the WLAN auxiliary information comprises at least one of: maximum resource allocation which is able be provided for the UE by a Radio Access Network (RAN), WLAN threshold information and RAN threshold information, wherein the WLAN threshold is a signal threshold of the WLAN or a load threshold of the WLAN;

wherein the offloading rule information comprises at least one of: a method for using a WLAN threshold and a method for using a RAN threshold, wherein the method for using WLAN threshold refers to that the RAN provides the WLAN threshold for the UE in the WLAN auxiliary information.

2. The method as claimed in claim 1, wherein the source side information further comprises: WLAN measurement report information, wherein the WLAN measurement report information comprises at least one of:

signal quality, measured by the UE, of the WLAN; signal strength, measured by the UE, of the WLAN; a load, measured by the UE, of the WLAN; and a Wide Area Network (WAN), index measured by the UE.

3. The method as claimed in claim 1, wherein the measurement configuration information comprises at least one of:

information of a triggering event of a measurement report, identification information of an alternative WLAN to be measured, information of a reporting period of a measurement report and information of range of content carried in a measurement report.

4. The method as claimed in claim 1, wherein the target side network element for handover of the UE receives the source side information sent by the source side network element in at least one of manners as follows: X2 interface signalling, S1 interface signalling, Iur interface signalling, a manner of forwarding through a Mobility Management Entity (MME), a manner of forwarding through a Service General Packet Radio Service Supporting Node (SGSN), a manner of forwarding through the MME and the SGSN and a manner of forwarding through the SGSN and the MME; and/or, the target side network element sends the target side information to the source side network element in at least one of manners as follows: X2 interface signalling, S1 interface signalling, Iur interface signalling, a manner of forwarding through an MME, a manner of forwarding through an SGSN, a manner of forwarding through the SGSN and the MME and a manner of forwarding through the MME and the SGSN.

5. An offloading processing method, comprising:

receiving, by User Equipment (UE), at least one of following target side information sent by a target side network element of handover of the UE: Wireless Local Area Network (WLAN) auxiliary information, offloading rule information, and measurement configuration information; and executing, by the UE, offloading processing according to at least one of the target side information;

wherein the WLAN auxiliary information comprises at least one of: maximum resource allocation which is able be provided for the UE by a Radio Access Network (RAN), WLAN threshold information and RAN threshold information, wherein the WLAN threshold is a signal threshold of the WLAN or a load threshold of the WLAN;

wherein the offloading rule information comprises at least one of: a method for using a WLAN threshold and a method for using a RAN threshold, wherein the method for using WLAN threshold refers to that the RAN provides the WLAN threshold for the UE in the WLAN auxiliary information.

6. The method as claimed in claim 5, the target side information further comprises: load information and offloading decision information; wherein executing, by the UE, offloading processing according to at least one of the target side information comprises at least one of the followings:

performing WLAN measurement according to at least one of the following target side information: the WLAN auxiliary information and the WLAN measurement configuration information;

reporting a measurement report according to at least one of the following target side information: the WLAN auxiliary information and the WLAN measurement configuration information;

determining an offloading decision according to at least one of the following target side information: the WLAN auxiliary information, the load information and the offloading rule information; and performing offloading according to a determined offloading decision.

7. A device for processing an information interaction, comprising:

a first receiving component, configured for a target side network element for handover of User Equipment (UE) to receive at least one of following source side information sent by a source side network element: Wireless Local Area Network (WLAN) auxiliary information, offloading rule information, and information indicating a capability in supporting interoperation with a WLAN; and/or, a sending component, configured for the target side network element to send at least one of following target side information to the source side network element: WLAN auxiliary information, offloading rule information, measurement configuration information and information indicating a capability in supporting interoperation with the WLAN;

wherein the WLAN auxiliary information comprises at least one of: maximum resource allocation which is able be provided for the UE by a Radio Access Network (RAN), WLAN threshold information and RAN threshold information, wherein the WLAN threshold is a signal threshold of the WLAN or a load threshold of the WLAN;

wherein the offloading rule information comprises at least one of: a method for using a WLAN threshold and a method for using a RAN threshold, wherein the method for using WLAN threshold refers to that the RAN provides the WLAN threshold for the UE in the WLAN auxiliary information.

8. An offloading processing device, comprising:

a second receiving component, configured for User Equipment (UE) to receive at least one of the following target side information sent by a target side network element of handover of the UE: Wireless Local Area Network (WLAN) auxiliary information, offloading rule information and measurement configuration information; and an executing component, configured for the UE to execute offloading processing according to at least one of the target side information;

wherein the WLAN auxiliary information comprises at least one of: maximum resource allocation which is able be provided for the UE by a Radio Access Network (RAN), WLAN threshold information and RAN threshold information, wherein the WLAN threshold is a signal threshold of the WLAN or a load threshold of the WLAN;

wherein the offloading rule information comprises at least one of: a method for using a WLAN threshold and a method for using a RAN threshold, wherein the method for using WLAN threshold refers to that the RAN provides the WLAN threshold for the UE in the WLAN auxiliary information.

9. The offloading processing device as claimed in claim 8, the target side information further comprises: load information and offloading decision information; wherein the executing component comprises at least one of:

a measurement element, configured to perform WLAN measurement according to at least one of the following target side information: the WLAN auxiliary information and the WLAN measurement configuration information;

a reporting element, configured to report a measurement report according to at least one of the following target side information: the WLAN auxiliary information and the WLAN measurement configuration information;

a determining element, configured to determine an offloading decision according to at least one of the following target side information: the WLAN auxiliary information, the load information and the offloading rule information; and an offloading element, configured to perform offloading according to a determined offloading decision.

10. The method as claimed in claim 1, wherein the source side information and the target side information further comprise: a offloading decision information, wherein the offloading decision information comprises at least one of: information indicating the UE to execute offloading from the RAN to the WLAN, information indicating the UE to execute offloading from the WLAN to the RAN, decision information of offloading a part of services of the UE in the RAN to the WLAN, decision information of offloading all the services of the UE in the RAN to the WLAN, decision information of offloading a part of services of the UE in the WLAN to the RAN, decision information of offloading all the services of the UE in the WLAN to the RAN, decision information of offloading a part of bearers of the UE in the RAN to the WLAN, decision information of offloading all the bearers of the UE in the RAN to the WLAN, decision information of offloading a part of bearers of the UE in the WLAN to the RAN and decision information of offloading all the bearers of the UE in the WLAN to the RAN.

* * * * *